June 6, 1967
J. HOWIESON ETAL
3,324,008
FUEL ROD STRUCTURE
Filed Aug. 5, 1965
3 Sheets-Sheet 1
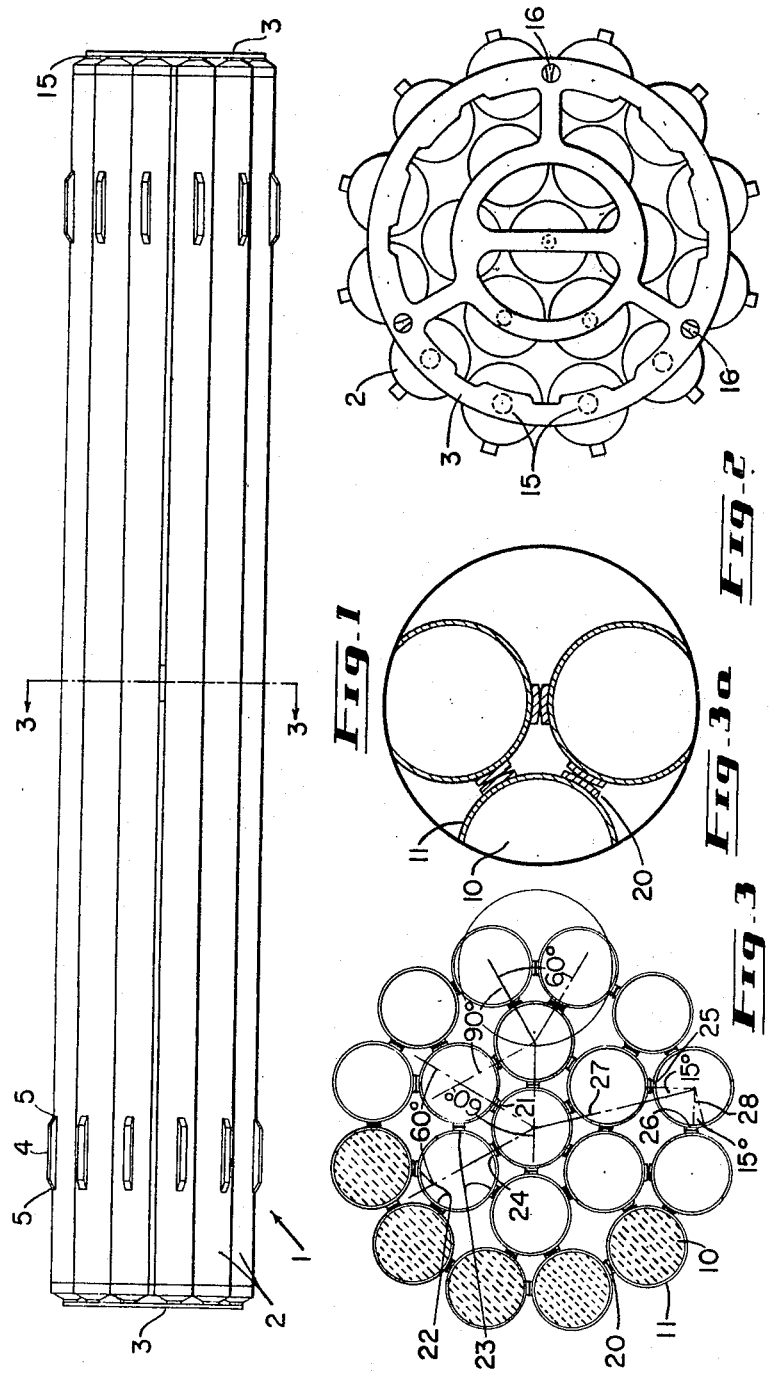

June 6, 1967 J. HOWIESON ETAL 3,324,008
FUEL ROD STRUCTURE
Filed Aug. 5, 1965 3 Sheets-Sheet 2

June 6, 1967 J. HOWIESON ETAL 3,324,008
FUEL ROD STRUCTURE
Filed Aug. 5, 1965 3 Sheets-Sheet 3

United States Patent Office 3,324,008
Patented June 6, 1967

3,324,008
FUEL ROD STRUCTURE
Joseph Howieson, Cobourg, Ontario, and John C. McGregor, Port Hope, Ontario, Canada, assignors to Atomic Energy of Canada Limited, Ottawa, Ontario, Canada
Filed Aug. 5, 1965, Ser. No. 477,403
Claims priority, application Canada, Aug. 28, 1964, 910,528
6 Claims. (Cl. 176—78)

This invention relates to nuclear fuel rods and assemblies, and has particular reference to the reduction of wear and breakdown in such rods.

In a nuclear reactor which consists basically of fuel elements spaced in a moderator and coolant matrix, it is convenient to fabricate the fuel pieces as rods which can be inserted, moved through and withdrawn from the matrix and it is further convenient to make these rods so that each is a bundle or cluster of smaller elements. Each element consists of a nuclear fuel material containing for instance, uranium such as uranium dioxide which may be formed as pellets and then encased in a container preferably tubular with sealed ends. The container or cladding is required because the environment in which the fuel rods are placed is generally corrosive and the cladding also prevents the spread of radioactive products of fission and nuclear bombardment of the fuel.

A suitable substance for the cladding has been found to be the zirconium alloy Zircaloy 2 which is tough and has a high resistance to corrosion coupled with low neutron absorption. It is advantageous to make the thickness of the cladding as small as possible in order to reduce its absorption of the neutrons produced in the reactor. The reduction in thickness results in increased chances of cladding penetration, bowing of the rods, local expansion and blistering. These distortions can lead to the occurrence of hot spots due to improper cooling. Consequent rapid corrosion of the cladding then results.

In one arrangement the fuel elements in each cluster are conveniently and for ease and economy of assembly held together solely at their ends by spiders or open plate spacers and there is thus a tendency for slight longitudinal and transverse relative movement of the elements so that distorted elements may abrade one another or fret with consequent cladding penetration.

It is an object of the invention to overcome the problems experienced in the prior art and to provide a fuel element assembly in which contact between elements is prevented in an effective manner.

Specific embodiments of the invention will now be described with reference to the drawings in which:

FIGURE 1 shows a side view of a fuel rod comprising a cluster of elements,

FIGURE 2 shows an end view of the cluster of FIGURE 1,

FIGURE 3 shows a section along line 3—3 of FIGURE 1,

FIGURE 3a shows an enlarged fragmentary view of FIGURE 3,

Figure 7:
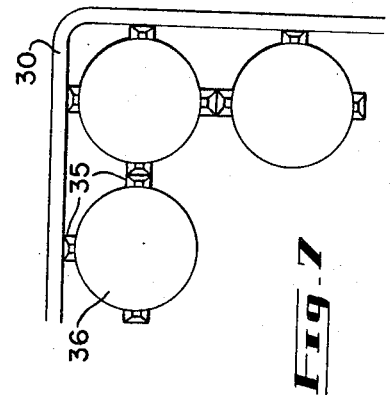
Figures 6, 8:
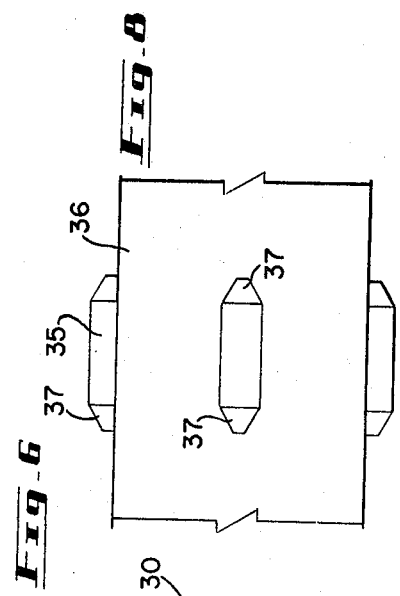
Figure 5:
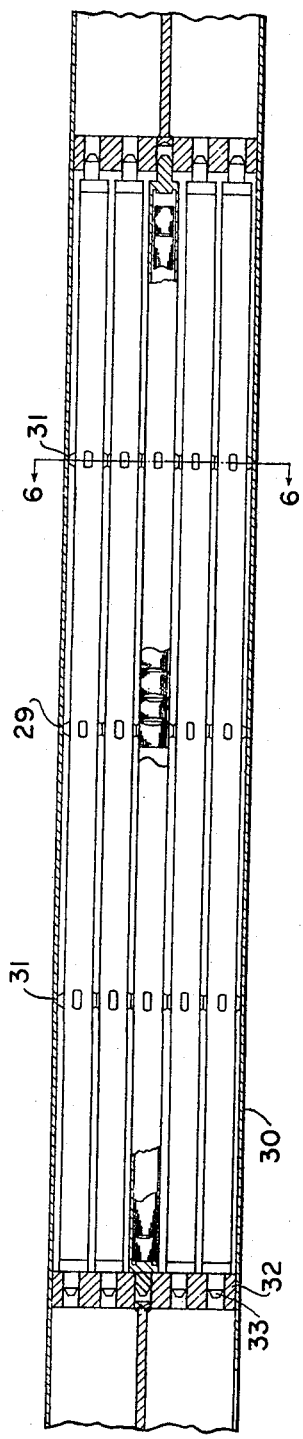

FIGURE 5, on a separate sheet, shows an alternative type of fuel bundle in section longitudinally with its own coolant channel surround, FIGURE 6 shows a section along line 6—6 of FIGURE 5, FIGURE 7 shows an enlarged view of a portion of FIGURE 6, and FIGURE 8 shows warts attached to an element in more detail.

Having reference first to FIGURE 1, a fuel cluster 1 comprises cylindrical fuel elements 2 held together by spacers 3. With reference to FIGURES 2 and 3, it can be seen that there is a central element surrounded by two concentrically arranged rings of elements. Although 19 elements have been shown the inner ring may contain seven elements to make a total of 22 in the cluster, as another alternative a cluster of 28 elements may be constructed. Many other alternative numbers of elements are possible. In the exemplified embodiment each element in the outer ring carries at two positions on the outermost point of its surface a wear pad 4 which projects beyond the surface of the assembly to contact the inner surface of a channel in the nuclear reactor into which the assembly is to be inserted. These wear pads are chamfered at their ends 5 to prevent scoring of the channel.

Figure 4:
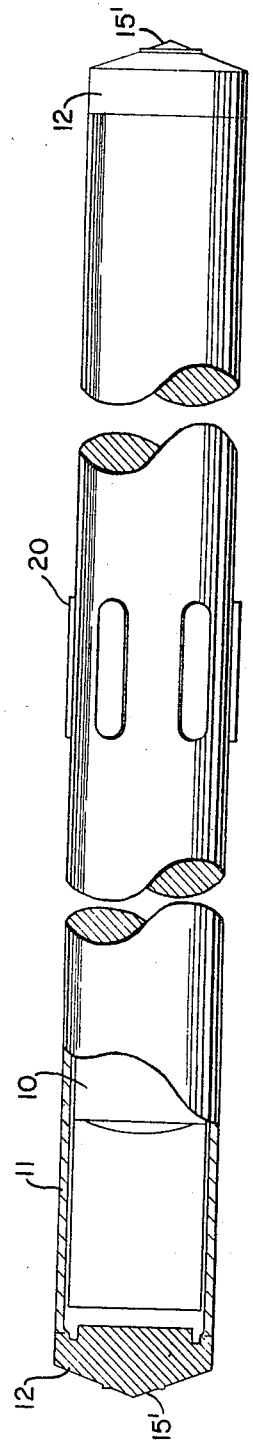
FIGURE 4 shows a central element in detail.

Referring briefly to FIGURES 3 and 4, the elements each comprise a central core 10 of pellets of fuel material surrounded by a thin cladding 11. As seen also in FIGURES 1 and 2, the ends of each fuel element comprise a thickened dome shaped cap 12 welded to the cladding and which engages the surface of the spider 3 and is fixed, by brazing, welding or riveting (for instance) at 15′ to the spider at area 15. Three reference holes 16 are present in the spider serving to position the punch for cutting the spiders from sheet and for locating the spider when the elements are being affixed to it.

Each element 2 is provided with a longitudinally extending wart 20 which engages the facing wart 20 of the adjacent element. As seen in FIGURES 1 and 3 there is one of these warts placed on each element at the central part of its length extending for a short distance either side of center in the axial direction. The warts may have cylindrically formed outer surfaces convex outwardly with the axis of the cylinder extending in the direction of the axis of the elements. Alternatively the outer surfaces may be flat. The central fuel element, together with its array of warts can be seen, partly in section, in FIGURE 4. Each element is thus supported at its ends by the spider 3 and prevented from bowing and coming into contact with an adjacent element by the warts 20. Since each wart is fixed only to its particular element, each element is free to slide longitudinally with respect to the adjacent ones and all frictional contact takes place at the warts on a line contact with cylindrical faced warts, and with surface contact using flat faced warts.

The choice between flat and curved surfaces for the warts depends largely on the particular application of the fuel rods but in general flat surfaces give (i) greater contact area and thus may give better resistance to removal of material by wear and fretting, (ii) flat surfaces tend to give better alignment and positioning of elements relatively to one another (contoured surfaces may slide off to one side more easily). The contoured surfaces give (i) line contact and better cooling of wart faces for a lower temperature, (ii) no chance of sharp cornered contacts, (iii) greater ease of fabrication.

The angular placement of the warts 20 about the axis of the fuel elements depends upon the location of the element namely whether it is the central one, in the inner ring, or the outer ring. In the embodiment illustrated in FIGURE 3, with three series of elements, for the central element, each wart 21 is spaced 60° round the circumference, making the total of six warts in all. For the inner ring of fuel elements, each having five warts, the outwards facing warts 22 are spaced 60° from one another, on one side of the element, and on the inwardly facing side each wart 23 and 24 is spaced 60° from the next. The outer two warts 22 are each 90° from their adjacent inwardly directed wart 23. For each element in the outer ring which has three warts the inwardly facing wart 25 is 15° offset from the radius 27 drawn from the axis of the central element in the cluster through the axis of that outer ring element. Each of the outer two warts 26 is offset inwards an angle of 15° from the radius 28 of the fuel element perpendicular to the radius 27 just mentioned.

In a prototype structure using cylindrically faced warts the fuel elements were of radius 0.3 inch and the radius of the outer surface of each wart was about 1.6 inches. The width of each wart was 0.1 inch and its height about 0.025 inch. The elements were of length approximately 20 inches, and the length of the warts was approximately 0.34 inch. While we do not wish to be restricted to these dimensions, they have been given in explaining this particularly effective specific embodiment, having three series of elements.

Having reference now to FIGURE 5, a side view of a second embodiment is shown containing an outer shell 30. The cluster of elements in this instance is in a rectangular arrangement and they are located by end plates 32 which engage nose projections 33 on each element. In this cluster warts are placed in three planes transverse to the length of the elements which in the prototype were approximately 25 inches long. Warts are placed in the plane 29 half way along the elements and in planes 31 approximately 6 inches from either end. As can be seen by reference to FIGURES 6 and 7, the warts 35 are all separated by 90° from one another around each fuel element 36 and may be of unequal thickness. This allows for different clearances between the elements and the shell 30 as FIGURE 6 shows. The warts may suitably be brazed or welded to the cladding of their respective elements for instance such as by initially coating each wart in beryllium. Each end 37 of the warts 35 is chamfered. This is of assistance in assembly of the fuel cluster when the elements 36 are being slid into their casing shell 30. During this time the warts will tend to ride up and over one another whereas jamming would occur if the ends 37 were abrupt.

In general therefore it can be observed that the use of cooperating warts between the elements in a cluster can prevent the elements from approaching too closely to one another. They may be placed at intervals along the length of the elements as needed and wear pads may also be placed in area adjacent the warts.

These warts are short and therefore interfere very little with the coolant flow, the streamlined shape as seen in FIGURE 8 is also helpful in reducing any such interference.

We claim:

1. In a fuel cluster for a nuclear reactor comprising an assembly of fuel elements each comprising a fuel material and a cladding surrounding the material, the improvement which comprises, a wart affixed to the surface of said cladding of a first element in at least one region proximate to a second region on the cladding of an adjacent element, and a second wart affixed in the second region of the adjacent element, contact between the first and adjacent elements taking place through said warts.

2. Apparatus as defined in claim 1, said warts being cylindrically faced and being convex outwards, contact between cooperating warts being essentially line contact.

3. Apparatus as defined in claim 1, said warts being flat on their mutually engaging faces.

4. Apparatus as defined in claim 1, comprising warts affixed to each element in a plurality of proximate regions along the length of each element.

5. Apparatus as defined in claim 1, said warts extending in a direction longitudinally of said elements and being chamfered at longitudinally separated ends for allowing sliding and mounting movement of one wart over an adjacent wart when said elements are being assembled by relative sliding longitudinal motion.

6. Apparatus as defined in claim 5, said warts being shaped for streamlining flow of coolant past said warts in the longitudinal direction of said elements.

References Cited

UNITED STATES PATENTS

| 3,197,381 | 7/1965 | Blake | 176–78 X |
| 3,228,854 | 1/1966 | Bekkering et al. | 176–78 |
| 3,255,090 | 6/1966 | Leirvik | 176–78 X |

FOREIGN PATENTS

| 655,180 | 1/1963 | Canada. |
| 962,266 | 7/1964 | Great Britain. |

CARL D. QUARFORTH, *Primary Examiner.*

BENJAMIN R. PADGETT, *Examiner.*

M. J. SCOLNICK, *Assistant Examiner.*